E. P. HUTTEN & J. McDOUGALL.
FOLDING EYEGLASSES.
APPLICATION FILED MAY 18, 1911.
1,016,153.
Patented Jan. 30, 1912.
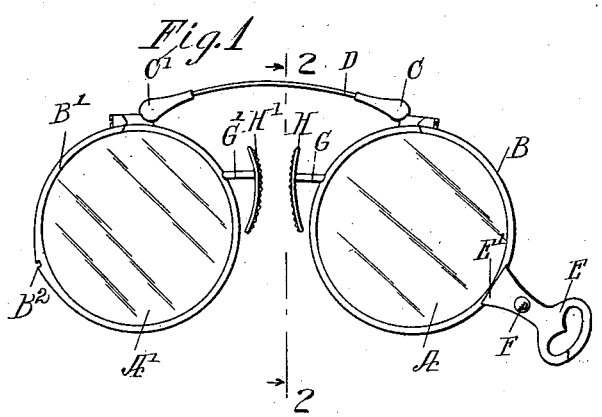
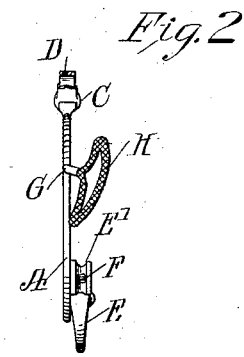
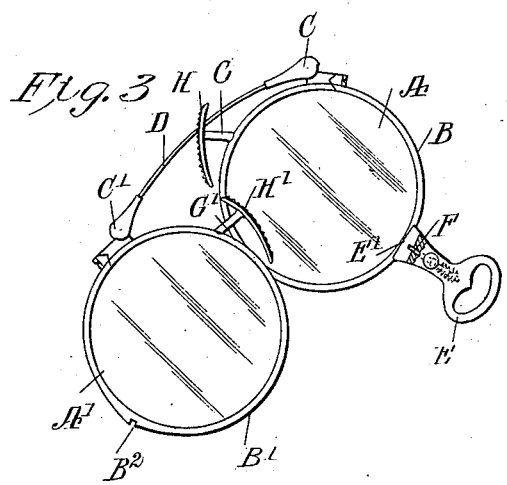
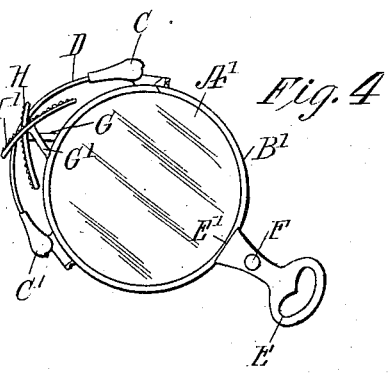
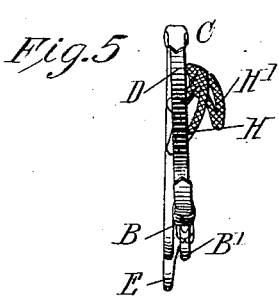
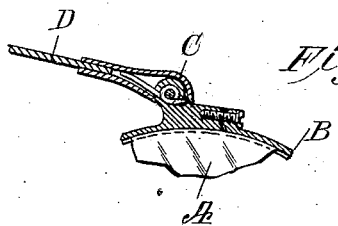
WITNESSES
INVENTORS
Edwin P. Hutten
John McDougall
BY
ATTORNEYS

UNITED STATES PATENT OFFICE.

EDWIN P. HUTTEN, OF EAST RUTHERFORD, NEW JERSEY, AND JOHN McDOUGALL, OF NEW YORK, N. Y.

FOLDING EYEGLASSES.

1,016,153.  Specification of Letters Patent.  Patented Jan. 30, 1912.

Application filed May 18, 1911. Serial No. 627,898.

*To all whom it may concern:*

Be it known that we, EDWIN P. HUTTEN and JOHN McDOUGALL, both citizens of the United States, and residents, respectively, of East Rutherford, in the county of Bergen and State of New Jersey, and of the city of New York, borough of the Bronx, in the county and State of New York, have invented new and Improved Folding Eyeglasses, of which the following is a full, clear, and exact description.

The object of the invention is to provide new and improved folding eye glasses provided with angular nose clips and arranged to permit of folding one lens over the other without hindrance by the projecting clips and without unduly straining the spring pivotally connecting the lens frames with each other.

For the purpose mentioned, use is made of lens frames pivotally connected with each other by a spring, and provided with rigid posts carrying angular nose clips adapted to pass each other on swinging one frame toward the other and to allow of turning the frames on their pivots to pass one frame over the other.

A practical embodiment of the invention is represented in the accompanying drawings forming a part of this specification, in which similar characters of reference indicate corresponding parts in all the views.

Figure 1 is a rear face view of a pair of folding eye glasses in open position; Fig. 2 is a transverse section on the line 2—2 of Fig. 1; Fig. 3 is a rear face view of a pair of folding eye glasses showing the lens frames partly folded; Fig. 4 is a similar view of the same showing the lens frames folded and locked; Fig. 5 is an edge view of the same; and Fig. 6 is an enlarged sectional side elevation of one of the pivotal connections between a lens frame and the corresponding end of the spring.

The lenses A and A' are mounted in lens frames B and B', provided at the top with pivots C, C', engaged by the terminals of a spring D connecting the lens frames with each other. On the outer portion of the lens frame B is mounted a handle E, provided at its inner end with a guideway E' adapted to receive a notched portion B² of the lens frame B' when the latter is moved into a folded position, and the said handle E is provided with a spring catch F, of any improved construction, adapted to engage the notched portion B² so as to hold the lens frame B' in folded position on top of the lens frame B, as plainly indicated in Figs. 4 and 5. The spring catch F is provided with an exterior knob under the control of the user, for conveniently unlocking the catch F to allow the lens frame B' to swing into an open position, as shown in Fig. 1.

The lens frames B and B' are provided on opposite sides with rigid posts G and G', extending toward each other, and carrying at their ends rigid angular nose clips H and H' approximately triangular in shape, and projecting inwardly to readily engage the sides of the nose so as to hold the eye glasses in proper position on the nose with the lenses A and A' a distance in front of the eyes so as not to interfere with the eyelashes.

The rear edges of the nose clips H and H' are inclined from the top downward and forward, and the lower terminals of the said nose clips H and H' are adjacent to but preferably disconnected from the lens frames B and B', so that the nose clips H and H' are completely free of the lens frames but are rigidly supported on the posts G and G'.

By reference to Fig. 1 it will be noticed that when the lenses are in open position the lower terminals of the nose clips H, H' are approximately adjacent the middle inner portions of the lens frames B, B' while the posts G, G' are located higher up on the lens frames B, B'. By this arrangement the offset clips H, H' are located relative to the spring D and its pivotal connections C, C' with the lens frames B, B' so that the nose clips H, H' readily pass each other when swinging the lens frames B, B' into folded position.

The spring D and its pivotal connections C and C' connecting the spring D with the frames B and B', are so arranged relative to the nose clips H and H' that when the operator swings the lens frame B downward into the position shown in Fig. 3, then the clips H and H' pass each other to permit of now turning the lens frames B and B' on their pivots C and C' to cause the front edge of the clip H' to engage the rear edge of the clip H, at the same time engaging the notched portion B² with the catch F to lock the lens frames B and B' in folded position, as plainly indicated in Figs. 4 and 5. On swinging the lens frames B and B' into final folded position, the middle portion of the spring D engages the forward portion of the nose clip H at the post G, the spring being placed under tension during the folding operation.

When it is desired to use the folding eye glasses, the operator simply presses the knob of the spring catch F outward so that the spring catch F disengages the notched portion B² to allow the lens frame B' to swing outward into open position owing to the tension of the spring D. The terminals of the spring D are spring-pressed so as to cause the lens frames B, B' to assume the proper open position relative to the spring D.

The special construction of the pivotal connections C and C' does not form a part of this application, and we do not limit ourselves to the particular construction shown and described.

From the foregoing it will be seen that by the arrangement described, angular and rearwardly projecting nose clips can be used on the eye glasses to insure a firm hold of the eye glasses on the nose without bringing the lenses too close to the eyes, and at the same time the lenses and lens frames can be folded one upon the other when the eye glasses are not in use, so as to take up very little room.

Having thus described our invention, we claim as new and desire to secure by Letters Patent:

1. A pair of eye glasses, comprising lenses, frames for holding the lenses, a spring pivotally connected at its ends with the said frames at the top thereof, posts on the said lens frames and projecting toward each other, and nose clips on the said posts and projecting in the same direction and being outside of the plane of the frames, the spring being of such length and it and the clips being so arranged relatively one to the other that the clips pass one another on swinging one lens frame toward the other to fold the said frames one upon the other.

2. A pair of eye glasses, comprising lenses, frames for holding the lenses, a spring pivotally connected at its ends with the said lens frames, posts integral on the said lens frames and projecting toward each other, and nose clips integral on the said posts and extending transversely, the terminals of the nose clips being free of the lens frames and projecting inwardly, the said spring being of such length and it and the clips being so arranged relative one to the other that the clips pass one another on swinging one lens frame toward the other to fold the said frames one upon the other.

3. A pair of eye glasses, comprising lenses, frames for holding the lenses, a spring pivotally connected at its ends with the said lens frames, posts integral on the said lens frames and projecting toward each other, and nose clips integral on the said posts and extending transversely, the inner edges of the nose clips being inclined and the lower terminals of the clips being adjacent the lens frames, the said spring being of such length and it and the clips being so arranged relative one to the other that the clips pass one another on swinging one lens frame toward the other to fold the said frames one upon the other.

4. A pair of eye glasses, comprising lenses, frames for holding the lenses, a spring pivotally connected at its ends with the said lens frames, posts integral on the said lens frames and projecting toward each other, nose clips integral on the said posts and extending transversely, the said spring and clips being arranged to allow the clips to pass one another on swinging one lens frame toward the other to allow the lens frames to turn on their pivots to fold one lens frame on the other, a handle on one of the lens frames and having a guideway for receiving the other lens frame, and a spring catch on the said handle for engagement with the entering lens frame to lock the lens frames in folded position.

In testimony whereof we have signed our names to this specification in the presence of two subscribing witnesses.

EDWIN P. HUTTEN.
JOHN McDOUGALL.

Witnesses:
 THEO. G. HOSTER,
 PHILIP D. ROLLHAUS.

---

Copies of this patent may be obtained for five cents each, by addressing the "Commissioner of Patents, Washington, D. C."